Dec. 24, 1929.           C. KUPFER           1,740,926
DECIMAL TABULATOR FOR TYPEWRITERS
Filed Feb. 16, 1927

Inventor
C. Kupfer
By Marks & Clerk
Attys.

Patented Dec. 24, 1929

1,740,926

UNITED STATES PATENT OFFICE

CARL KUPFER, OF NUREMBERG, GERMANY, ASSIGNOR TO TRIUMPH-WERKE NURNBERG A.-G., OF NUREMBERG, GERMANY

DECIMAL TABULATOR FOR TYPEWRITERS

Application filed February 16, 1927, Serial No. 168,772, and in Germany February 17, 1926.

Object of the invention is a decimal tabulator for typewriters, whose riders are received by a stop bar of U-shaped cross-section. The legs of this bar contain vertical slots, the front slots of which are higher than the rear ones for the purpose of facilitating the insertion of the riders, but covered partly by a safety-rail afterwards fastened with screws and which limits the forward movement of the riders which are provided with shoulders adapted to bear against the said safety rail.

Figure 2:
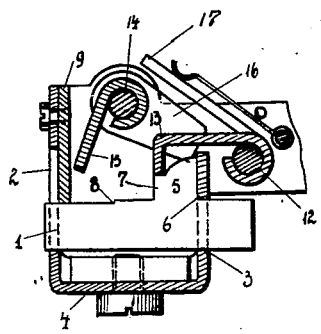
Figure 3:
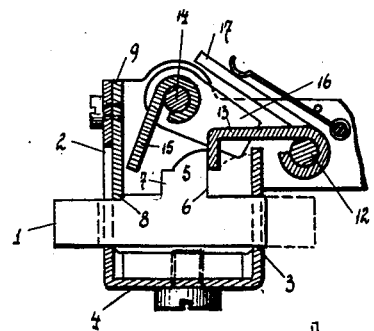
Figure 4:
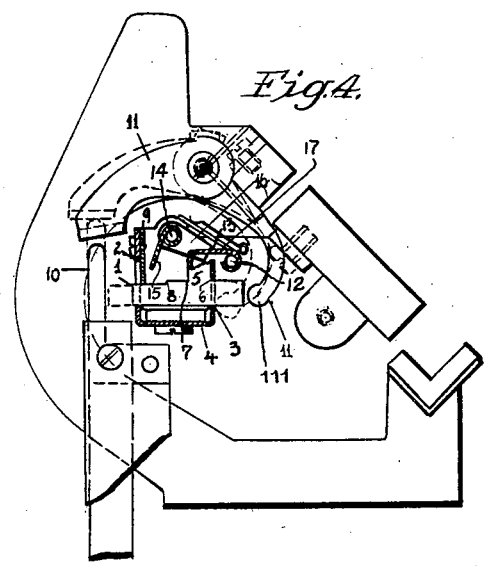
Figure 5:
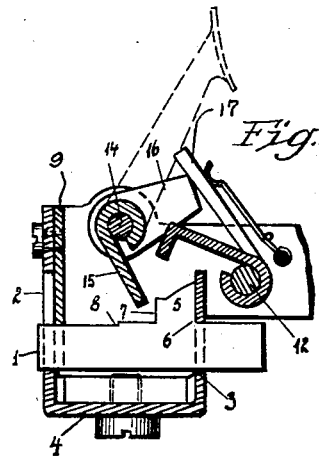
Figure 1:
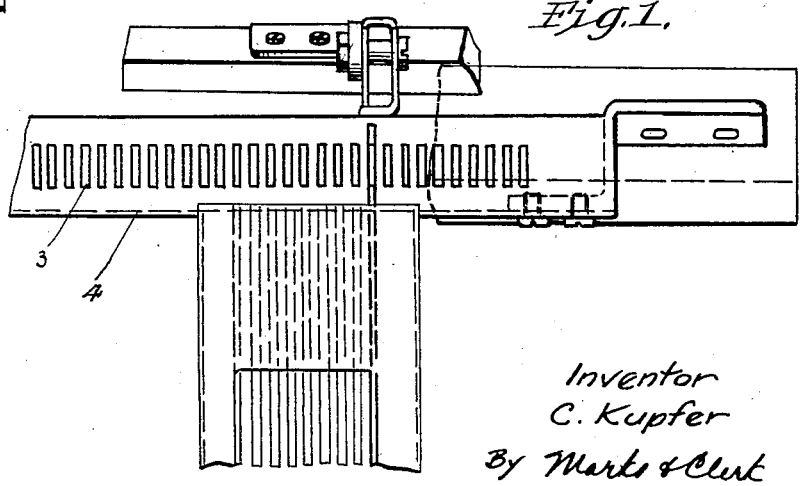

On the drawing the object of invention is signified by means of a sample of execution. It is shown on Fig. 1 the front view of the decimal tabulator, Figure 2 shows the decimal tabulator in cross-section with a rider retracted in its operative position, Figure 3 shows the decimal tabulator in cross-section with a rider projected out into its operative position, Figure 4 shows the decimal tabulator in cross section on a smaller scale with a rider in the inoperative position, together with the mechanism surrounding the rider, and Figure 5 shows the decimal tabulator in cross-section with the rider in the inoperative position and showing the means for returning the riders to inoperative position after it has effected the return of the riders.

The riders, of stamped sheet metal, are placed removably in cross-slots 2, 3 in the flanges of the stop bar 4 of U-shaped cross-section each containing between the two flanges of this bar a stop 5 with a rear shoulder 6 and two front shoulders 7, 8. For the purpose of putting the riders 1 into the U-shaped bar 4 the front slot 2 is higher than the rear slot 3, so that the riders 1 can be brought into the slots 2, 3 from the front-side. Afterwards the front-slots 2 are covered partly by a safety-rail 9 fastened with screws to the bar 4 and allowing the riders to pass though the slots 2 with the front end.

The riders are projected in the usual manner by means of an adjusting bar 10 and lever 11 (Fig. 4) of the adjusting key, the motion of each rider being limited by the shoulder 8. The rider is kept in its projected position by rail 13 which is movable around pin 12. The return of the rider 1 into the state of rest is done by means of a flat-rail 15 turnable around pin 14 and connected with cam 16. The cam 16 acts together with the spring-lever 17 of the rail 13.

The arrangement described above has the follwing effect:

By pressing the adjusting key the adjusting bar 10 is lifted thereby turning the lever 11, which with its arm 111 bears against the front edge of the rider and pushes same forward until it is arrested by contact of the shoulder 8 against the safety-rail 9. Whilst pushing forward rider 1, the wedgeshaped catch 5 presses upon the front leg of the rail 13 turning the latter anticlockwise so that catch 5 can pass beneath the leg of this rail.

As soon as catch 5 of the rider 1 comes out of contact with the leg of rail 13, the latter returns to its state of rest by means of the influence of its spring, viz catch 5 rests now with its vertical plane on the leg of rail 13 (Fig. 3). Thus the rider 1 is secured in its advanced position and at present it is impossible to bring it back to its former position.

The return of all adjusted riders to their original position takes place by turning the rail 15 by means of a hand-lever. Whilst turning rail 15 the cam 16 is placed against lever 17 of the rail 13 (Fig. 5), turning same so that its front-leg stops arresting the riders 1. At the same time rail 15 is placed against all riders driving them back to their state of rest. Now other riders can be adjusted in the above mentioned manner.

Having described my invention I claim:

1. In a decimal tabulator for typewriters, the combination with a U-section stop bar having front and rear vertical slots, said front slots being higher than said rear slots, of riders capable of sliding backward and forward in said slots, abutments on said riders capable of limiting the backward sliding movement of the riders in the rear vertical slots but able to pass right through the front vertical slots.

2. In a decimal tabulator as set forth in claim 1, abutments on the riders for limiting the forward sliding movement of the riders in the front vertical slots, and means capable of attachment to the U-section stop bar after the insertion of the riders so as partly to cover the said front vertical slots and capable of coacting with the abutments on the riders for limiting the forward movement thereof.

3. In a decimal tabulator for typewriters, the combination with a U-section stop bar having front and rear vertical slots, said front slots being higher than said rear slots, of riders capable of sliding backward and forward in said slots, stops on said riders having a front and rear abutment shoulder for limiting the forward and backward sliding movement of the riders in said vertical slots, said riders being capable of passing right through said front vertical slots, and a safety rail capable of attachment to the U-section stop bar after the insertion of the riders so as partly to cover the said front vertical slots and capable of coacting with the abutments on the riders for limiting the forward movement thereof.

In testimony whereof I affix my signature.

CARL KUPFER.